United States Patent

Ikeno et al.

(10) Patent No.: US 6,913,833 B2
(45) Date of Patent: Jul. 5, 2005

(54) ADDITION REACTION CURABLE ORGANOPOLYSILOXANE COMPOSITION

(75) Inventors: Masayuki Ikeno, Maebashi (JP); Syuichi Azechi, Takasaki (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 75 days.

(21) Appl. No.: 10/635,569

(22) Filed: Aug. 7, 2003

(65) Prior Publication Data

US 2004/0028917 A1 Feb. 12, 2004

(30) Foreign Application Priority Data

Aug. 8, 2002 (JP) .......... 2002-232038

(51) Int. Cl.⁷ .............................. B32B 25/20
(52) U.S. Cl. ................. 428/447; 528/31; 528/32; 525/447
(58) Field of Search ............ 428/447; 528/31, 528/32; 525/447

(56) References Cited

U.S. PATENT DOCUMENTS

| | | | | |
|---|---|---|---|---|
| 3,457,214 A | * | 7/1969 | Modic | .......... 524/863 |
| 4,077,943 A | | 3/1978 | Sato et al. | |
| 4,257,936 A | | 3/1981 | Matsumoto et al. | |
| 5,324,542 A | * | 6/1994 | Modic | .......... 427/387 |
| 5,360,858 A | | 11/1994 | Fujiki et al. | |
| 5,631,320 A | | 5/1997 | Kamohara et al. | |
| 5,854,344 A | | 12/1998 | Shiono et al. | |

FOREIGN PATENT DOCUMENTS

| | | |
|---|---|---|
| EP | 0 497 277 | 8/1992 |
| JP | 59-5219 | 2/1984 |

* cited by examiner

*Primary Examiner*—Kuo-Liang Peng
(74) *Attorney, Agent, or Firm*—Oblon, Spivak, McClelland, Maier & Neustadt, P.C.

(57) ABSTRACT

A composite cured product body is provided, which includes a first cured product part formed from a condensation reaction curable silicone rubber, and a second cured product part adhering to a surface of said first cured part formed from an addition reaction curable organopolysiloxane composition. The addition reaction curable organopolysiloxane composition includes:

(A) an organopolysiloxane with at least 2 alkenyl groups bonded to silicon atoms,
(B) an organohydrogenpolysiloxane with at least 2 hydrogen atoms bonded to silicon atoms,
(C) a hydrosilylation reaction catalyst, and
(D) at least one organopolysiloxane with at least one monovalent group bonded to a silicon atom and represented by the formula (1):

$$—O—SiR_2(OH) \qquad (1)$$

or the formula (2):

$$—R^1—Si(OR^2)_a R^3_{3-a} \qquad (2).$$

19 Claims, No Drawings

ADDITION REACTION CURABLE ORGANOPOLYSILOXANE COMPOSITION

BACKGROUND OF THE INVENTION

1. Field of the Invention

The present invention relates to an addition reaction curable organopolysiloxane composition, and in particular to an addition reaction curable organopolysiloxane composition which displays good adhesion to cured products of condensation reaction curable silicone rubbers, and is useful as a sealing material, a potting material, a coating material, and particularly as a coating material for preventing the adhesion of aquatic organisms to ships.

2. Description of the Prior Art

The intermolecular forces in organopolysiloxanes are small (that is, the cohesive strength between molecules is small), and as a result, silicone rubber materials typically display excellent releasability, although on the other hand, they tend to display rather poor adhesion to substrates.

Accordingly, in order to produce addition reaction curable silicone rubber adhesives with good adhesion to a variety of substrates, much research has been conducted into the addition of adhesion imparting components to addition reaction curable organopolysiloxane compositions, as a way of generating good adhesion. For example, the use of organohydrogensiloxanes containing an epoxy group (Japanese Post-Examination Patent publication (kokoku) No. 53-13508 (JP53-13508 B)), corresponding to U.S. Pat. No. 4,077,943, and organohydrogensiloxanes containing an epoxy group and an alkoxysilyl group (Japanese Post-Examination Patent publication (kokoku) No. 59-5219 (JP59-5219B)) has already been disclosed. These techniques enabled the adhesion of conventional addition reaction type silicone rubber adhesives to metals and resins and the like to be improved considerably, although even these compositions displayed absolutely no adhesion to cured products of condensation reaction curable silicone rubber, and a resolution to this problem has been keenly sought.

Japanese Patent Publication No. 3232009 (JP3232009B), corresponding to U.S. Pat. No. 5,854,344, discloses the addition of an organopolysiloxane containing a silanol group to an addition reaction curable composition, although the object and effect of this addition is to improve the redispersibility of a precipitated inorganic filler, and moreover, Japanese Patent Publication No. 3184231 (JP3184231B), corresponding to EP 497,277A, discloses the addition of an organopolysiloxane represented by a formula $CH_2=CH(CH_3)_2SiO[(CH_3)_2SiO]_3Si(OCH_3)_3$ to a silicone rubber composition, although the object and effect of this addition is to generate a cured product with excellent durability to repeated deformation such as bending or elongation, and in both cases, no mention is made of improving the adhesion relative to a condensation reaction curable silicone rubber cured product.

SUMMARY OF THE INVENTION

The present invention takes the above circumstances into consideration, with an object of providing an addition reaction curable organopolysiloxane composition with good adhesion to cured products of condensation reaction curable silicone rubbers.

As a result of intensive investigations aimed at achieving the above object, the inventors of the present invention discovered that by adding an organopolysiloxane in which the molecular terminals are blocked with a hydroxyl group and/or an alkoxy group to an addition reaction curable organopolysiloxane composition, good adhesion to cured products of condensation reaction curable silicone rubbers could be generated, and were hence able to complete the present invention.

In other words, the present invention relates to an addition reaction curable organopolysiloxane composition for use as a coating for a condensation reaction curable silicone rubber cured product, comprising:

(A) 100 parts by weight of an organopolysiloxane with at least 2 alkenyl groups bonded to silicon atoms within each molecule, (B) an organohydrogenpolysiloxane with at least 2 hydrogen atoms bonded to silicon atoms within each molecule, in sufficient quantity that a number of hydrogen atoms bonded to silicon atoms within a single molecule is within a range from 1 to 7 per alkenyl group within said organopolysiloxane of component (A), (C) an effective quantity of a hydrosilylation reaction catalyst, and (D) 1 to 50 parts by weight of at least one organopolysiloxane containing, within each molecule, at least one monovalent group bonded to a silicon atom and represented by either a formula (1) shown below:

$$-O-SiR_2(OH) \tag{1}$$

wherein, each R represents, independently, an unsubstituted or substituted monovalent hydrocarbon group of 1 to 10 carbon atoms, or a formula (2) shown below:

$$-R^1-Si(OR^2)_a R^3_{3-a} \tag{2}$$

wherein, $R^1$ represents an oxygen atom or an alkylene group of 2 or more carbon atoms, each $R^2$ represents, independently, an alkyl group, each $R^3$ represents, independently, an unsubstituted or substituted monovalent hydrocarbon group of 1 to 10 carbon atoms, and a represents an integer from 1 to 3. The addition curable silicone organopolysiloxane composition is markedly excellent in adhesion to cured products of condensation reaction curable silicone rubbers, and therefore is useful as a sealing material, a potting material, a coating material which are required to have good adhesion to cured products of condensation reaction curable silicone rubbers, and particularly as a coating material for preventing the adhesion of aquatic organisms to ships.

The present invention also provides a composite cured product body comprising a first cured product part formed from a condensation reaction curable silicone rubber, and a second cured product part adhering to a surface of said first cured part formed from an addition reaction curable organopolysiloxane composition stated above.

The present invention further provides a method of producing said composite cured product body stated above, comprising:

applying an addition reaction curable organopolysiloxane composition according to claim 1 on a surface of a cured product of a condensation reaction curable silicone rubber, and curing said addition reaction curable organopolysiloxane composition to form said second cured product part.

The present invention still further provides use of an addition reaction curable organopolysiloxane composition stated above in formation of said composite cured product body.

DETAILED DESCRIPTION OF THE PREFERRED EMBODIMENTS

As follows is a more detailed description of the present invention.

[Component (A)]

An organopolysiloxane of the component (A) is a primary component (the base polymer) of a composition of the present invention, and contains at least 2 alkenyl groups bonded to silicon atoms within each molecule.

Suitable examples of the alkenyl groups include vinyl groups, allyl groups, propenyl groups, isopropenyl groups, butenyl groups, pentenyl groups, hexenyl groups and heptenyl groups, although vinyl groups are particularly preferred. The bonding position of the alkenyl groups within the organopolysiloxane may be at the molecular chain terminals, or as side chains of the molecular chain.

Examples of groups other than the alkenyl groups which may be bonded to the silicon atoms include unsubstituted or substituted monovalent hydrocarbon groups of 1 to 12 carbon atoms, and preferably from 1 to 8 carbon atoms. Specific examples of such groups include alkyl groups such as methyl groups, ethyl groups, propyl groups, butyl groups, pentyl groups, hexyl groups, heptyl groups, octyl groups, nonyl groups and decyl groups; cycloalkyl groups such as cyclopentyl groups and cyclohexyl groups; aryl groups such as phenyl groups, tolyl groups, xylyl groups and α- or β-naphthyl groups; aralkyl groups such as benzyl groups, phenethyl groups and 3-phenylpropyl groups; and halogenated alkyl groups such as chloromethyl groups, 3-chloropropyl groups and 3,3,3-trifluoropropyl groups, although of these, methyl groups and phenyl groups are particularly preferred.

The molecular structure of the component (A) may be a straight chain, a straight chain with some branching, a cyclic structure or a branched chain structure, although typically the principal chain is formed basically from repeating diorganosiloxane units, and straight chain diorganopolysiloxanes with both terminals of the molecular chain blocked with triorganosiloxy groups are preferred.

Furthermore, in terms of the curability and the physical characteristics of the cured product, the actual quantity of the aforementioned 2 or more alkenyl groups included within each molecule should preferably result in a ratio, relative to the total number of unsubstituted or substituted monovalent hydrocarbon groups bonded to silicon atoms, including the alkenyl groups, of 0.001 to 10 mol %, and even more preferably from 0.01 to 5 mol %.

In addition, in order to produce a product silicone rubber with good physical characteristics and ensure a good level of workability for the composition, the viscosity of the component (A) at 25° C. is preferably within a range from 100 to 20,000,000 mPa·s, with values within a range from 300 to 100,000 mPa·s being particularly preferred. Furthermore, the component(A) may be a homopolymer, a copolymer, or a mixture of the two.

Specific examples of the organopolysiloxane of the component (A) include copolymers of dimethylsiloxane and methylvinylsiloxane with both molecular chain terminals blocked with trimethylsiloxy groups, methylvinylpolysiloxane with both molecular chain terminals blocked with trimethylsiloxy groups, copolymers of dimethylsiloxane, methylvinylsiloxane and methylphenylsiloxane with both molecular chain terminals blocked with trimethylsiloxy groups, dimethylpolysiloxane with both molecular chain terminals blocked with dimethylvinylsiloxy groups, methylvinylpolysiloxane with both molecular chain terminals blocked with dimethylvinylsiloxy groups, copolymers of dimethylsiloxane and methylvinylsiloxane with both molecular chain terminals blocked with dimethylvinylsiloxy groups, copolymers of dimethylsiloxane, methylvinylsiloxane and methylphenylsiloxane with both molecular chain terminals blocked with dimethylvinylsiloxy groups, dimethylpolysiloxane with both molecular chain terminals blocked with trivinylsiloxy groups, organopolysiloxane copolymers formed from siloxane units represented by the formula $R^4{}_3SiO_{0.5}$, siloxane units represented by the formula $R^4{}_2R^5SiO_{0.5}$, siloxane units represented by the formula $R^4{}_2SiO$ and a small quantity of siloxane units represented by the formula $SiO_2$, organopolysiloxane copolymers formed from siloxane units represented by the formula $R^4{}_3SiO_{0.5}$, siloxane units represented by the formula $R^4{}_2R^5SiO_{0.5}$ and siloxane units represented by the formula $SiO_2$, organopolysiloxane copolymers formed from siloxane units represented by the formula $R^4{}_2R^5SiO_{0.5}$, siloxane units represented by the formula $R^4{}_2SiO$, and a small quantity of siloxane units represented by the formula $SiO_2$, and organopolysiloxane copolymers formed from siloxane units represented by the formula $R^4R^5SiO$, and a small quantity of siloxane units represented by the formula $R^4SiO_{1.5}$ or siloxane units represented by the formula $R^5SiO_{1.5}$ (wherein, in the above formulas within this pragraph, $R^4$ represents the same groups bonded to silicon atoms as described above other than the alkenyl groups, $R^5$ represents the same alkenyl groups as described above. These (co)polymers may be used singularly, or in combinations of two or more different (co)polymers.

[Component (B)]

An organopolysiloxane of the component (B) contains at least 2, and preferably 3 or more hydrogen atoms bonded to silicon atoms (namely, SiH groups) within each molecule, which undergo an addition reaction with the alkenyl groups of the component (A) via a hydrosilylation reaction, and as such, functions as a cross linking agent within a composition of the present invention.

The bonding position of the silicon atom bonded hydrogen atoms (namely, SiH groups) within the component (B) may be at the molecular chain terminals, and/or on side chains of the molecular chain. Examples of groups other than the hydrogen atoms which may be bonded to the silicon atoms include the same non-alkenyl unsubstituted or substituted monovalent hydrocarbon groups of 1 to 12 carbon atoms, and preferably from 1 to 8 carbon atoms, as those described above for the component (A). Specific examples of such groups include alkyl groups such as methyl groups, ethyl groups, propyl groups, butyl groups, pentyl groups, hexyl groups, heptyl groups, octyl groups, nonyl groups and decyl groups; cycloalkyl groups such as cyclopentyl groups and cyclohexyl groups; aryl groups such as phenyl groups, tolyl groups, xylyl groups and α- or β-naphthyl groups; aralkyl groups such as benzyl groups, phenethyl groups and 3-phenylpropyl groups; and halogenated alkyl groups such as chloromethyl groups, 3-chloropropyl groups and 3,3,3-trifluoropropyl groups, although of these, methyl groups and phenyl groups are particularly preferred.

The molecular structure of the component (B) may be a straight chain, a straight chain with some branching, a cyclic structure, a branched structure, or a three dimensional network type structure. In order to produce a product silicone rubber with good physical characteristics and ensure a good level of workability for the composition, the viscosity of the component (B) at 25° C. is preferably within a range from 1 to 1000 mPa·s, with values within a range from 5 to 500 mPa·s being particularly preferred.

Suitable examples of the organohydrogenpolysiloxane of the component (B) include 1,1,3,3-tetramethyldisiloxane, 1,3,5,7-tetramethylcyclotetrasilixane, cyclic polymers of methylhydrogensiloxane, methylhydrogenpolysiloxane with both molecular chain terminals blocked with trimethylsiloxy groups, copolymers of dimethylsiloxane and methylhydrogensiloxane with both molecular chain terminals blocked with trimethylsiloxy groups, copolymers of dimethylsiloxane, methylhydrogensiloxane and methylphenylsiloxane with both molecular chain terminals blocked with trimethylsiloxy groups, dimethylpolysiloxane with both molecular chain terminals blocked with dimethylhydrogensiloxy groups, copolymers of dimethylsiloxane and methylhydrogensiloxane with both molecular chain terminals blocked with dimethylhydrogensiloxy groups, copolymers of dimethylsiloxane and methylphenylsiloxane with both molecular chain terminals blocked with dimethylhydrogensiloxy groups, methylphenylpolysiloxane with both molecular chain terminals blocked with dimethylhydrogensiloxy groups, organopolysiloxane copolymers formed from siloxane units represented by the formula $R^4_3SiO_{0.5}$, siloxane units represented by the formula $R^4_2HSiO_{0.5}$, and a small quantity of siloxane units represented by the formula $SiO_2$, organopolysiloxane copolymers formed from siloxane units represented by the formula $R^4_2HSiO_{0.5}$ and a small quantity of siloxane units represented by the formula $SiO_2$, and organopolysiloxane copolymers formed from siloxane units represented by the formula $R^4HSiO$, and a small quantity of siloxane units represented by the formula $R^4SiO_{1.5}$ or siloxane units represented by the formula $HSiO_{1.5}$ (wherein, in the above formulas, $R^4$ represents the same monovalent hydrocarbon groups as described above other than the alkenyl groups). These (co)polymers may be used singularly, or in combinations of two or more different (co)polymers.

The quantity of the component (B) should be a quantity such that the number of hydrogen atoms bonded to silicon atoms (SiH groups) within a single molecule of the component (B) is within a range from 1 to 7, and preferably within a range from 1.5 to 5, per alkenyl group bonded to a silicon atom within the component (A). The reason for this requirement is that if the number of hydrogen atoms bonded to silicon atoms within the component (B), per alkenyl group bonded to a silicon atom within the component (A), is less than 1 then the composition may not cure adequately, whereas if the number exceeds 7, the heat resistance of the product silicone rubber may deteriorate markedly.

[Component (C)]

The component (C) used in the present invention may be any catalyst capable of accelerating the addition reaction between the alkenyl groups of the component (A) and the SiH group(s) of the component (B). A typical example of such a catalyst includes a platinum family metal-based catalyst, e.g., catalysts based on platinum, palladium, or rhodium. Suitable examples include chloroplatinic acid and alcohol modified chloroplatinic acids; coordination compounds of chloroplatinic acid with olefins, vinylsiloxanes complexes or acetylene compounds; as well as tetrakis(triphenylphosphine)palladium or chlorotris(triphenylphosphine)rhodium, although platinum-based compounds are particularly preferred.

There are no particular restrictions on the quantity of the component (C), which need only be an effective catalytic quantity. A typical quantity, calculated as the weight of the metallic element within the catalyst relative to the combined weight of the components (A) and (B), is within a range from 1 to 500 ppm, and preferably from 10 to 100 ppm. If the quantity of the component (C) is too small, then the addition reaction becomes markedly slower or curing may not occur at all, whereas in contrast, if the quantity is too large, the heat resistance of the polysiloxane composition following curing deteriorates, and the process becomes uneconomic in terms of the quantity of the precious metal catalyst used.

[Component (D)]

The component (D) is a component for improving the adhesion of a composition of the present invention to condensation reaction curable silicone rubber cured products, and is an extremely important component which characterizes a composition of the present invention.

In view of the target object to which the composition is to be bonded is a condensation reaction curable silicone rubber cured product, the component (D) utilizes at least one organopolysiloxane containing, within each molecule, at least one monovalent group bonded to a silicon atom and represented by either a formula (1) shown below:

$$-\text{O}-\text{SiR}_2(\text{OH}) \tag{1}$$

(wherein, each R represents, independently, an unsubstituted or substituted monovalent hydrocarbon group of 1 to 10 carbon atoms), or a formula (2) shown below:

$$-R^1-Si(OR^2)_aR^3_{3-a} \tag{2}$$

(wherein, $R^1$ represents an oxygen atom or an alkylene group of 2 or more carbon atoms, each $R^2$ represents, independently, an alkyl group, each $R^3$ represents, independently, an unsubstituted or substituted monovalent hydrocarbon group of 1 to 10 carbon atoms, and a represents an integer from 1 to 3).

The viscosity at 25° C. of the organopolysiloxane of the component (D) is preferably within a range from 5 to 50,000 mPa·s, and from the viewpoint of ensuring good permeability into the condensation reaction curable silicone rubber cured product, viscosity values within a range from 10 to 10,000 mPa·s are even more preferred. The molecular structure of the organopolysiloxane may be a straight chain, a straight chain with some branching, or a branched chain structure, although straight chain structures are preferred. Examples of the groups bonded to the silicon atoms of this organopolysiloxane, other than the groups represented by the formulas (1) and (2) above, include the same alkenyl groups and other unsubstituted or substituted monovalent hydrocarbon groups of 1 to 12 carbon atoms, and preferably from 1 to 8 carbon atoms, described above for the component (A). Specific examples include alkyl groups such as methyl groups, ethyl groups, propyl groups, butyl groups, pentyl groups, hexyl groups, heptyl groups, octyl groups, nonyl groups and decyl groups; cycloalkyl groups such as cyclopentyl groups and cyclohexyl groups; alkenyl groups such as vinyl groups, allyl groups, propenyl groups, isopropenyl groups, butenyl groups, pentenyl groups, hexenyl groups and heptenyl groups; aryl groups such as phenyl groups, tolyl groups, xylyl groups and α- or β-naphthyl groups; aralkyl groups such as benzyl groups, phenethyl groups and 3-phenylpropyl groups; and halogenated alkyl groups such as chloromethyl groups, 3-chloropropyl groups and 3,3,3-trifluoropropyl groups.

As described above, R in the aforementioned formula (1) represents an unsubstituted or substituted monovalent hydrocarbon group of 1 to 10 carbon atoms, and preferably from 1 to 8 carbon atoms, and specific examples include the same alkyl groups, cycloalkyl groups, alkenyl groups, aryl groups, aralkyl groups and halogenated alkyl groups described above as "groups bonded to the silicon atoms of this organopolysiloxane, other than the groups represented by the formulas (1) and (2)". Accordingly, specific examples of the group represented by the formula (1) include dimethylhydroxysiloxy groups and methylphenylhydroxysiloxy groups.

Examples of the group represented by the formula (1) include —OSi(CH$_3$)$_2$OH, —OSi(C$_6$H$_5$)$_2$OH, —OSi(CH$_3$)(C$_6$H$_5$)OH, —OSi(CH$_3$)(CH=CH$_2$)OH, —OSi(C$_6$H$_5$)(CH=CH$_2$)OH, and —OSi(C$_2$H$_5$)$_2$OH.

As described above, R$^1$ in the aforementioned formula (2) represents an oxygen atom or an alkylene group of 2 or more, and preferably from 2 to 4, carbon atoms. In those cases in which R$^1$ is an alkylene group, suitable examples include methylmethylene groups, ethylene groups, propylene groups, trimethylene groups, tetramethylene groups and hexamethylene groups, although ethylene groups, methylmethylene groups and hexamethylene groups are preferred, and ethylene groups and methylmethylene groups are particularly desirable.

R$^2$ in the aforementioned formula (2) represents an alkyl group, and preferably an alkyl group of 1 to 10 carbon atoms. Suitable examples include alkyl groups such as methyl groups, ethyl groups, propyl groups, butyl groups, pentyl groups, hexyl groups, heptyl groups, octyl groups, nonyl groups and decyl groups, although alkyl groups of 1 to 4 carbon atoms are preferred, and methyl groups and ethyl groups are particularly desirable. Furthermore, specific examples of the alkoxy group represented by the formula (OR$^2$) include methoxy groups, ethoxy groups, propoxy groups, isopropoxy groups, butoxy groups, pentyloxy groups and hexyloxy groups.

As described above, R$^3$ in the aforementioned formula (2) represents an unsubstituted or substituted monovalent hydrocarbon group of 1 to 10 carbon atoms, and preferably from 1 to 8 carbon atoms. Specific examples include alkyl groups such as methyl groups, ethyl groups, propyl groups, butyl groups, pentyl groups, hexyl groups, heptyl groups, octyl groups, nonyl groups and decyl groups; cycloalkyl groups such as cyclopentyl groups and cyclohexyl groups; alkenyl groups such as vinyl groups, allyl groups, propenyl groups, isopropenyl groups, butenyl groups, pentenyl groups, hexenyl groups and heptenyl groups; aryl groups such as phenyl groups, tolyl groups, xylyl groups and α- or β-naphthyl groups; aralkyl groups such as benzyl groups, phenethyl groups and 3-phenylpropyl groups; and halogenated alkyl groups such as chloromethyl groups, 3-chloropropyl groups and 3,3,3-trifluoropropyl groups. Of these, the groups other than the alkenyl groups are preferred, alkyl groups of 1 to 4 carbon atoms are even more preferred, and methyl groups and ethyl groups are particularly desirable.

Specific examples of the group represented by the formula (2) include trimethoxysiloxy groups, methyldimethoxysiloxy groups, methyldiethoxysiloxy groups and triethoxysiloxy groups in the case in which R$^1$ in the formula (2) is an oxygen atom, and groups represented by the formula —CH$_2$CH$_2$—Si(OCH$_3$)$_3$, the formula —CH$_2$CH$_2$—Si(OC$_2$H$_5$)$_3$ and the formula —CH$_2$CH$_2$—Si(CH$_3$)(OCH$_3$)$_2$ in the case in which R$^1$ in the formula (2) is an alkylene group.

Specific examples of the component (D) of the present invention containing a group represented by the formula (1) or the formula (2) are listed below. However, the component (D) is in no way restricted to the compounds shown below.

HO(CH$_3$)$_2$SiO[(CH$_3$)$_2$SiO]$_n$H (CH$_3$O)$_3$SiO[(CH$_3$)$_2$SiO]$_n$H, (CH$_3$O)$_3$SiO[(CH$_3$)$_2$SiO]$_n$Si(OCH$_3$)$_3$, (CH$_3$O)$_2$(CH$_3$)SiO[(CH$_3$)$_2$SiO]$_n$Si(CH$_3$)(OCH$_3$)$_2$, (CH$_3$O)$_2$(CH$_2$=CH)SiO[(CH$_3$)$_2$SiO]$_n$Si(CH=CH$_2$)(OCH$_3$)$_2$, (CH$_3$O)$_2$(CH$_2$=CH)SiO[(CH$_3$)$_2$SiO]$_n$Si(OCH$_3$)$_3$,

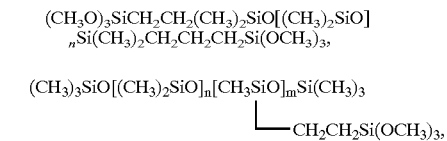

(CH$_3$O)$_3$SiCH$_2$CH$_2$(CH$_3$)$_2$SiO[(CH$_3$)$_2$SiO]$_n$Si(CH$_3$)$_2$CH$_2$CH$_2$CH$_2$Si(OCH$_3$)$_3$,

(CH$_3$)$_3$SiO[(CH$_3$)$_2$SiO]$_n$[CH$_3$SiO]$_m$Si(CH$_3$)$_3$
       |
       CH$_2$CH$_2$Si(OCH$_3$)$_3$,

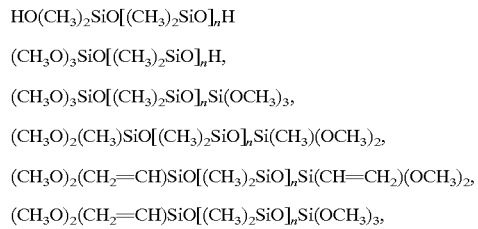

HO(CH$_3$)$_2$SiO[(CH$_3$)$_2$SiO]$_n$[CH$_3$SiO]$_m$Si(CH$_3$)$_2$OH
       |
       CH$_2$CH$_2$Si(OCH$_3$)$_3$ (wherein in each of the above formulas, either n, or the sum of n and m, is a number which results in a viscosity at 25° C. for the organopolysiloxane which falls within a range from 5 to 50,000 mPa·s, and is typically an integer from 3 to 100, and preferably from 4 to 50, and even more preferably from 5 to 30, and furthermore m is typically an integer within a range from 1 to 50, and preferably from 2 to 30).

These compounds may be used singularly, or in combinations of two or more compounds.

The quantity of the component (D) must be sufficient to impart a good level of adhesiveness to the composition, and is typically a quantity within a range from 1 to 50 parts by weight, and preferably from 1 to 30 parts by weight, per to 100 parts by weight of the component (A). If the quantity of the component (D) is less than 1 part by weight then a satisfactory adhesion imparting effect cannot be achieved, whereas if the quantity exceeds 50 parts by weight, a significant reduction in physical strength occurs.

[Component (E)]

An organic solvent of the component (E) is a component which is used, where necessary, to improve the flow characteristics or the wetting characteristics of the composition. Suitable examples of the solvent include aromatic hydrocarbon solvents such as toluene and xylene; aliphatic hydrocarbon solvents such as hexane and heptane; and ketone-based solvents such as acetone and methyl ethyl ketone. Two or more of these solvents may be used in combination, as necessary. Of these, aromatic hydrocarbon solvents such as toluene and xylene are preferred. In those cases in which a component (E) is added to a composition, the quantity should be sufficient to generate the desired flow characteristics or wetting characteristics. Specifically, solvent quantities of no more than 500 parts by weight per 100 parts by weight of the combined weight of the components (A) to (D) are preferred.

[Other Components]

Any of the conventionally known retarding agent compounds identified as having a curing suppression effect on addition reaction catalysts can be added to a composition of the present invention as an extra component, additional to the aforementioned components (A) to (E). Examples of this addition reaction retarding agent include phosphorus containing compounds such as triphenylphosphine and triphenylphosphite; nitrogen containing compounds such as tributylamine, tetramethylethylenediamine and benzotriazole; sulfur containing compounds; as well as acetylene-based compounds such as 1-ethynyl-1-cyclohexanol, compounds with at least 2 alkenyl groups, hydroperoxy compounds, and maleic acid derivatives. The degree of curing retardation produced by the addition reaction retarding agent varies considerably depending on the chemical structure of the retarding agent compound. Accordingly, the quantity of the addition reaction retarding agent should be adjusted to the most appropriate quantity for the particular retarding agent being used, although in general if this quantity is too small, the long term storage stability of the composition at room temperature is inadequate, whereas in contrast if the quantity is too large, curing can be inhibited entirely.

In addition, examples of other possible components include inorganic fillers such as fumed silica, crystalline silica, precipitated silica, hollow fillers, silsesquioxanes, fumed titanium dioxide, magnesium oxide, zinc oxide, iron oxide, aluminum hydroxide, magnesium carbonate, calcium carbonate, zinc carbonate, layered mica, carbon black, diatomaceous earth and glass fiber, as well as fillers in which a filler such as that described above is surface treated with an organoalkoxysilane compound, an organochlorosilane compound, an organosilazane compound such as hexamethyldisilazane or an organosilicon compound such as a low molecular weight siloxane compound. Furthermore, silicone rubber powders or silicone resin powders may also be used.

Furthermore, other components may also be added to the composition, provided such addition does not impair the effects of the present invention, and examples of other possible components include organopolysiloxanes with one hydrogen atom or alkenyl group bonded to a silicon atom within each molecule, organopolysiloxanes which have no hydrogen atoms or alkenyl groups bonded to the silicon atoms, crepe hardening prevention agents, heat resistance imparting agents, flame retardant materials, plasticizers, thixotropic agents, pigments, dyes and mould prevention agents.

The addition reaction curable organopolysiloxane composition according to the present invention is capable of adhering satisfactorily to cured products of any condensation reaction curable silicone rubbers.

The addition reaction curable organopolysiloxane composition is normally curable at a temperature of 25 to 200° C. The temperature suitable to curing can be controlled by use of a retarding agent described above. Thus, for example, a retarding agent is added in an appropriate quantity so that a curing reaction does not proceed at room temperature, or a desired composition is prepared immediately before use. A composition is applied on a target cured product of a condensation curable silicone rubber, and then cured. The method of application of the composition is not limited at all, including, e.g., brushing, and spraying. The target cured product of a condensation curable silicone rubber may have any shape or form without limitation, including e.g. sheet-like or blocky forms. The composition applied on the cured product may also have any shape or form, such as coating, sheet-like or blocky forms.

[Examples]

As follows is a more detailed description of the present invention using a series of examples and comparative examples, although the present invention is in no way restricted to the examples presented below. In the following description, the term "viscosity" always refers to the viscosity at 25° C.

EXAMPLES

A composition was prepared by mixing (A1) 45 parts by weight of a dimethylpolysiloxane with both molecular chain terminals blocked with dimethylvinylsiloxy groups and with a viscosity of 100 Pa·s, (A2) 45 parts by weight of a dimethylpolysiloxane with both molecular chain terminals blocked with dimethylvinylsiloxy groups and with a viscosity of 10 Pa·s, (A3) 10 parts by weight of a dimethylpolysiloxane with both molecular chain terminals blocked with trimethylsiloxy groups, containing 5 mol % of vinylmethylsiloxane units relative to the total number of siloxane units in the principal chain, and with a viscosity of 0.7 Pa·s, and 33 parts by weight of a hydrophobic silica with a specific surface area of 170 $m^2/g$ which had been surface treated with hexamethyldisilazane and contained trimethylsilyl groups on the surface; (B) 4.0 parts by weight of a methylhydrogenpolysiloxane with both molecular chain terminals blocked with trimethylsiloxy groups (in which the silicon atom bonded hydrogen atom content=0.54% by weight) and with a viscosity of 100 mPa·s (the molar ratio of SiH groups/vinyl groups contained within components (A1) to (A3) above (hereafter abbreviated as the "SiH/Vi ratio")= 2.0/1), 0.06 parts by weight of 1-ethynyl-1-cyclohexanol, and sufficient quantity of a complex of chloroplatinic acid and divinyltetramethyldisiloxane to generate a weight of platinum metal relative to the combined quantity of the components (A1) to (A3) and (B) of 30 ppm; and (D1) 10 parts by weight of a dimethylpolysiloxane with both molecular chain terminals blocked with trimethoxysiloxy groups and with a viscosity of 0.9 Pa·s. This composition was termed composition A.

Following dilution of the composition A with xylene solvent to generate a concentration of 50% by weight, the composition was applied to each of two cured sheets, one of which was formed from a condensation reaction curable silicone rubber of dealcoholization type KE4908 (brand name), and the other of which from condensation reaction curable silicone rubber of deoximation type KE45 (brand name), both manufactured by Shin-Etsu Chemical Co., Ltd., and then left to stand and allowed to cure for 72 hours at room temperature.

A cut was then inserted in the adhesion interface of each coating layer, and the free edge of the coating layer produced by the cut was gripped, and an attempt was made to peel the coating layer at an angle of 0° (namely, in a direction at an angle of 0° relative to the adhesion interface), but for both of the coating layers, no peeling was possible, indicating a good level of adhesion to both of the condensation reaction curable silicone rubber cured sheets.

Example 2

With the exception of replacing the 10 parts by weight of the dimethylpolysiloxane with both molecular chain terminals blocked with trimethoxysiloxy groups of the component (D1) used in Example 1 with (D2) 5 parts by weight of a dimethylpolysiloxane with both molecular chain terminals blocked with dimethylhydroxysiloxy groups and with a viscosity of 0.7 Pa·s, a composition was prepared in the same manner as Example 1. This composition was termed composition B.

Using the same method as described above for Example 1, this composition B was applied to the surface of two different condensation reaction curable silicone rubber cured products and subsequently cured, and the thus formed coating layers displayed no separation on 0° peeling, indicating a good level of adhesion to both of the condensation reaction curable silicone rubber cured sheets.

Example 3

With the exception of replacing the 10 parts by weight of the dimethylpolysiloxane with both molecular chain terminals blocked with trimethoxysiloxy groups of the component (D1) used in Example 1 with (D3) 10 parts by weight of a dimethylpolysiloxane represented by a formula shown below:

(CH₃O)₃SiCH₂CH₂Si(CH₃)₂O[(CH₃)₂SiO]₂₀₀(CH₃)₂SiCH₂CH₂Si(OCH₃)₃ and with a viscosity of 1 Pa·s, a composition was prepared in the same manner as Example 1. This composition was termed composition C.

Using the same method as described for Example 1, this composition C was applied to the surface of two different condensation reaction curable silicone rubber cured products and subsequently cured, and the thus formed coating layers displayed no separation on 0° peeling, indicating a good level of adhesion to both of the condensation reaction curable silicone rubber cured sheets.

Example 4

A composition was prepared by mixing (A1) 17 parts by weight of a dimethylpolysiloxane with both molecular chain terminals blocked with dimethylvinylsiloxy groups and with a viscosity of 100 Pa·s, (A2) 33 parts by weight of a dimethylpolysiloxane with both molecular chain terminals blocked with dimethylvinylsiloxy groups and with a viscosity of 10 Pa·s, (A3) 30 parts by weight of a dimethylpolysiloxane with both molecular chain terminals blocked with dimethylvinylsiloxy groups and with a viscosity of 1 Pa·s, (A4) 3 parts by weight of a dimethylpolysiloxane with both molecular chain terminals blocked with trimethylsiloxy groups, containing 10 mol % of vinylmethylsiloxane units within the total number of siloxane units in the principal chain, and with a viscosity of 0.7 Pa·s, (A5) 5 parts by weight of an organopolysiloxane resin formed from 39.5 mol % of (CH₃)₃SiO₁/₂ units, 6.5 mol % of (CH₃)₂(CH₂=CH)SiO₁/₂ units and 54 mol % of SiO₂ units, 22 parts by weight of a hydrophobic silica with a specific surface area of 170 m²/g which had been surface treated with hexamethyldisilazane and contained trimethylsilyl groups on the surface, and 5 parts by weight of an organopolysiloxane with both molecular chain terminals blocked with trimethylsilyl groups, containing 28 mol % of diphenylsiloxane units relative to the total number of siloxane units in the principal chain, and with a viscosity of 400 mPa·s; (B1) 1.8 parts by weight of a methylhydrogenpolysiloxane with both molecular chain terminals blocked with trimethylsiloxy groups (in which the silicon atom bonded hydrogen atom content=1.14% by weight) and with a viscosity of 45 mPa·s, (B2) 5.3 parts by weight of a dimethylpolysiloxane containing hydrogen atoms bonded to silicon atoms at the molecular terminals and on molecular side chains (in which the silicon atom bonded hydrogen atom content=0.54% by weight) and with a viscosity of 12 mPa·s (the SiH/Vi ratio (B1)+(B2)/[(A1) to (A5)]=3.5/1), 0.03 parts by weight of 1-ethynyl-1-cyclohexanol, and sufficient quantity of a complex of chloroplatinic acid and divinyltetramethyldisiloxane to generate a weight of platinum metal relative to the combined quantity of the components (A1) to (A5), (B1) and (B2) of 15 ppm; and (D4) 10 parts by weight of a dimethylpolysiloxane with both molecular chain terminals blocked with trimethoxysiloxy groups and with a viscosity of 0.4 Pa·s. This composition was termed composition D.

Using the same method as described for Example 1, this composition C was applied to the surface of two different condensation reaction curable silicone rubber cured products and subsequently cured, and the thus formed coating layers displayed no separation on 0° peeling, indicating a good level of adhesion to both of the condensation reaction curable silicone rubber cured sheets.

Example 5

With the exception of replacing the 10 parts by weight of the dimethylpolysiloxane with both molecular chain terminals blocked with trimethoxysiloxy groups of the component (D4) used in Example 1 with (D5) 10 parts by weight of an organopolysiloxane represented by a formula shown below, a composition was prepared in the same manner as Example 4. This composition was termed composition E.

CH₂=CH(CH₃)₂SiO[(CH₃)₂SiO]₃₀Si(OCH₃)₃

Using the same method as described for Example 1, this composition E was applied to the surface of two different condensation reaction curable silicone rubber cured products and subsequently cured, and the thus formed coating layers displayed no separation on 0° peeling, indicating a good level of adhesion to both of the condensation reaction curable silicone rubber cured sheets.

Example 6

A composition was prepared by mixing (A) 100 parts by weight of a dimethylpolysiloxane with both molecular chain terminals blocked with dimethylvinylsiloxy groups and with a viscosity of 10 Pa·s, and 10 parts by weight of a hydrophobic silica with a specific surface area of 120 m²/g which had been surface treated with hexamethyldisilazane and contained trimethylsilyl groups on the surface; (B) 1.5 parts by weight of a methylhydrogenpolysiloxane with both molecular chain terminals blocked with trimethylsiloxy groups (in which the silicon atom bonded hydrogen atom content=1.45% by weight) and with a viscosity of 5 mPa·s (the SiH/Vi ratio=4.1/1), 0.15 parts by weight of 1-ethynyl-1-cyclohexanol, sufficient quantity of a complex of chloroplatinic acid and divinyltetramethyldisiloxane to generate a weight of platinum metal relative to the combined quantity of the components (A) and (B) of 30 ppm, 0.5 parts by weight of triallyl isocyanurate, and 3 parts by weight of the compound shown in the formula below; and (D6) 5 parts by weight of a dimethylpolysiloxane with both molecular chain terminals blocked with dimethylhydroxysiloxy groups and with a viscosity of 0.7 Pa·s. This composition was termed composition F.

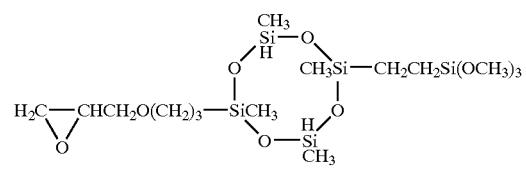

Using the same method as described for Example 1, this composition F was applied to the surface of two different condensation reaction curable silicone rubber cured products and subsequently cured, and the thus formed coating layers displayed no separation on 0° peeling, indicating a good level of adhesion to both of the condensation reaction curable silicone rubber cured sheets.

Comparative Example 1

With the exception of not using the dimethylpolysiloxane with both molecular chain terminals blocked with trimethoxysiloxy groups of the component (D1) used in Example 1, a composition was prepared in the same manner as Example 1. This composition was termed composition G.

Using the same method as described for Example 1, this composition G was applied to the surface of two different condensation reaction curable silicone rubber cured products and subsequently cured, and when the thus formed coating layers were subjected to the same 0° peeling test described in Example 1, in both cases the coating peeled easily away from the condensation reaction curable silicone rubber cured sheet, indicating no adhesion.

Comparative Example 2

With the exception of not using the dimethylpolysiloxane with both molecular chain terminals blocked with trimethoxysiloxy groups of the component (D4) used in Example 4, a composition was prepared in the same manner as Example 4. This composition was termed composition H.

Using the same method as described for Example 1, this composition H was applied to the surface of two different condensation reaction curable silicone rubber cured products and subsequently cured, and when the thus formed coating layers were subjected to the same 0° peeling test described in Example 1, in both cases the coating peeled easily away from the condensation reaction curable silicone rubber cured sheet, indicating no adhesion.

Comparative Example 3

With the exception of not using the dimethylpolysiloxane with both molecular chain terminals blocked with dimethylhydroxysiloxy groups of the component (D6) used used in Example 6, a composition was prepared in the same manner as Example 6. This composition was termed composition I.

Using the same method as described for Example 1, this composition I was applied to the surface of two different condensation reaction curable silicone rubber cured products and subsequently cured, and when the thus formed coating layers were subjected to the same 0° peeling test described in Example 1, in both cases the coating peeled easily away from the condensation reaction curable silicone rubber cured sheet, indicating no adhesion.

[Effects of the Invention]

An addition reaction curable organopolysiloxane composition of the present invention displays good adhesion to cured products of condensation reaction curable silicone rubbers, and is useful as a sealing material, a potting material, a coating material, and particularly as a coating material for preventing the adhesion of aquatic organisms to ships.

What is claimed is:

1. A composite cured product body comprising a first cured product part formed from a condensation reaction curable silicone rubber, and a second cured product part adhering to a surface of said first cured part formed from an addition reaction curable organopolysiloxane composition, wherein said addition reaction curable organopolysiloxane composition comprises:

(A) 100 parts by weight of an organopolysiloxane with at least 2 alkenyl groups bonded to silicon atoms within each molecule, (B) an organohydrogenpolysiloxane with at least 2 hydrogen atoms bonded to silicon atoms within each molecule, in sufficient quantity that a number of hydrogen atoms bonded to silicon atoms within a single molecule is within a range from 1 to 7 per alkenyl group within said organopolysiloxane of component (A), (C) an effective quantity of a hydrosilylation reaction catalyst, and (D) 1 to 50 parts by weight of at least one organopolysiloxane containing, within each molecule, at least one monovalent group bonded to a silicon atom and represented by either a formula (1) shown below:

$$—O—SiR_2(OH) \quad (1)$$

wherein, each R represents, independently, an unsubstituted or substituted monovalent hydrocarbon group of 1 to 10 carbon atoms, or a formula (2) shown below:

$$—R^1—Si(OR^2)_a R^3_{3-a} \quad (2)$$

wherein, $R^1$ represents an oxygen atom or an alkylene group of 2 or more carbon atoms, each $R^2$ represents, independently, an alkyl group, each $R^3$ represents, independently, an unsubstituted or substituted monovalent hydrocarbon group of 1 to 10 carbon atoms, and a represents an integer from 1 to 3.

2. The composite cured product body according to claim 1, wherein said alkyl groups present in the organopolysiloxane of the component (A) are vinyl groups.

3. The composite cured product body according to claim 1, wherein said alkenyl groups contained in the organopolysiloxane of the component (A) are present in each molecule in such a quantity that results in a ratio, relative to the total number of unsubstituted or substituted monovalent hydrocarbon groups bonded to silicon atoms, of 0.001 to 10 mol %.

4. The composite cured product body according to claim 1, wherein the organopolysiloxane of the component (A) has a viscosity at 25° C. within a range from 100 to 20,000,000 mPa·s.

5. The composite cured product body according to claim 1, wherein the organohydrogenpolysiloxane of the component (B) has 3 or more hydrogen atoms bonded to silicon atoms within each molecule.

6. The composite cured product body according to claim 1, wherein the organohydrogenpolysiloxane of the component (B) has a viscosity at 25° C. within a range from 1 to 1000 mPa·s.

7. The composite cured product body according to claim 1, wherein the catalyst of the component (C) is a platinum-based compound.

8. The composite cured product body according to claim 1, wherein the organopolysiloxane of the component (D) has a group having the formula (1), and R therein represents an alkyl group, cycloalkyl group, alkenyl group, aryl group, aralkyl group or haloalkyl group.

9. The composite cured product body according to claim 1, wherein the organopolysiloxane of the component (D) has a group having the formula (2), and $R^1$ is an alkylene group of 2–4 carbon atoms.

10. The composite cured product body according to claim 1, wherein the organopolysiloxane of the component (D) has a group having the formula (2), and $R^2$ is an alkyl group of 1 to 10 carbon atoms, and $R^3$ is independently an alkyl group, cycloalkyl group, alkenyl group, aryl group, aralkyl group, or halogenated alkyl group.

11. The composite cured product body according to claim 1, wherein the organopolysiloxane of the component (D) has a group having the formula (1), and that group is —OSi(CH$_3$)$_2$OH, —OSi(C$_6$H$_5$)$_2$OH, —OSi(CH$_3$)(C$_6$H$_5$)OH, —OSi(CH$_3$)(CH=CH$_2$)OH, —OSi(C$_6$H$_5$)(CH=CH$_2$)OH, or —OSi(C$_2$H$_5$)$_2$OH.

12. The composite cured product body according to claim 1, wherein the organopolysiloxane of the component (D) has a viscosity at 25° C. within a range from 5 to 50,000 mPa·s.

13. The composite cured product body according to claim 1, wherein the organopolysiloxane of the component (D) has a group having the formula (2), and that is trimethoxysiloxy group, methyldimethoxysiloxy group, methyldiethoxysiloxy group, triethoxysiloxy group, a group represented by the formula —CH₂CH₂—Si(OCH₃)₃, a group represented by the formula —CH₂CH₂—Si(OC₂H₅)₃, or a group represented by the formula —CH₂CH₂—Si(CH₃)(OCH₃)₂.

14. The composite cured product body according to claim 1, wherein the organopolysiloxane of the component (D) is HO(CH₃)₂SiO[(CH₃)₂SiO]ₙH, (CH₃O)₃SiO[(CH₃)₂SiO]ₙH, (CH₃O)₃SiO[(CH₃)₂SiO]ₙSi(OCH₃)₃, (CH₃O)₂(CH₃)SiO[(CH₃)₂SiO]ₙSi(CH₃)(OCH₃)₂, (CH₃O)₂(CH₂=CH)SiO[(CH₃)₂SiO]ₙSi(CH=CH₂)(OCH₃)₂, (CH₃O)₂(CH₂=CH)SiO[(CH₃)₂SiO]ₙSi(OCH₃)₃, (CH₃O)₃SiCH₂CH₂(CH₃)₂SiO[(CH₃)₂SiO]ₙSi(CH₃)₂CH₂CH₂Si(OCH₃)₃,

wherein in the above formulas, either n, or the sum of n and m, is a number which results in a viscosity at 25° C. for the organopolysiloxane which falls within a range from 5 to 50,000 mPa·s, or a combination of two or more of them.

15. The composite cured product body according to claim 1, wherein the component (C) is a platinum family metal-based catalyst, and it is present in a quantity within a range from 1 to 500 ppm calculated as the weight of the metallic element within the catalyst relative to the combined weight of the components (A) and (B).

16. The composite cured product body according to claim 1, wherein the organopolysiloxane of the component (D) is present in a quantity within a range from 1 to 30 parts by weight per 100 parts by weight of the component (A).

17. The composite cured product body according to claim 1, further comprising: (E) an organic solvent.

18. The composite cured product body according to claim 17, wherein said organic solvent is an aromatic hydrocarbon solvent, an aliphatic hydrocarbon solvent, a ketone-based solvent, or a combination of two or more thereof.

19. A method of producing a composite cured product body comprising a first cured product part formed from a condensation reaction curable silicone rubber, and a second cured product part adhering to the surface of said first cured product part from an addition reaction curable organopolysiloxane composition, said method comprising:

applying said addition reaction curable organopolysiloxane composition on a surface of a cured product of a condensation reaction curable silicone rubber, and curing said addition reaction curable organopolysiloxane composition to form said second cured product part, wherein said addition reaction curable organopolysiloxane composition comprises:

(A) 100 parts by weight of an organopolysiloxane with at least 2 alkenyl groups bonded to silicon atoms within each molecule, (B) an organohydrogenpolysiloxane with at least 2 hydrogen atoms bonded to silicon atoms within each molecule, in sufficient quantity that a number of hydrogen atoms bonded to silicon atoms within a single molecule is within a range from 1 to 7 per alkenyl group within said organopolysiloxane of component (A), (C) an effective quantity of a hydrosilylation reaction catalyst, and (D) 1 to 50 parts by weight of at least one organopolysiloxane containing, within each molecule, at least one monovalent group bonded to a silicon atom and represented by either a formula (1) shown below:

$$-\text{O}-\text{SiR}_2(\text{OH}) \quad (1)$$

wherein, each R represents, independently, an unsubstituted or substituted monovalent hydrocarbon group of 1 to 10 carbon atoms, or a formula (2) shown below:

$$-\text{R}^1-\text{Si}(\text{OR}^2)_a\text{R}^3_{3-a} \quad (2)$$

wherein, $R^1$ represents an oxygen atom or an alkylene group of 2 or more carbon atoms, each $R^2$ represents, independently, an alkyl group, each $R^3$ represents, independently, an unsubstituted or substituted monovalent hydrocarbon group of 1 to 10 carbon atoms, and a represents an integer from 1 to 3.

* * * * *